March 19, 1957

M. M. FRANCON 2,785,601

OPTICAL DEVICE FOR THE OBSERVATION OF
TRANSPARENT OBJECTS
Filed Nov. 10, 1952

Inventor
Maurice Michel Françon
By Allen & Allen
attorneys

United States Patent Office 2,785,601
Patented Mar. 19, 1957

2,785,601

OPTICAL DEVICE FOR THE OBSERVATION OF TRANSPARENT OBJECTS

Maurice Michel Françon, Paris, France, assignor to Centre National de la Recherche Scientifique, Paris, France, a corporation of France Application November 10, 1952, Serial No. 319,751

Claims priority, application France November 12, 1951

7 Claims. (Cl. 88—39)

The present invention relates to a device by means of which it is possible to observe easily with a microscope, transparent objects or portions of objects, normally invisible or hardly visible in an ordinary microscope, but which, due to local variations of refraction indexes or local variations in thickness and to the difference of phase of the light rays passing through said objects or portions of objects, which results from said variations, may be made visible by means of a suitable device.

The interferential and phase contrast methods have already been used for the observation of such objects. However, these methods, as presently used, lead to various drawbacks. More particularly, in the case of interferences, adjustment difficulties are encountered, whereas, in the phase contrast method, the phase plate stops part of the light beams, which leads to the formation of refraction fringes.

An object of the present invention is to provide a device which makes it possible to avoid the drawbacks of the prior methods, while preserving the advantages of the interferential method.

A device according to the invention, which is to be used in combination with a microscope, comprises, in successive order, a polariser, a unit formed of two crystalline plates, cut in a crystal at 45° on the optical axis thereof, said plates being optically crossed with respect to one another in said unit, and an analyser.

The said device may also comprise, between the unit formed of the two crystalline plates and the analyser, another auxiliary crystalline plate or a compensator, capable of producing a difference of path between the light rays, issuing from the said unit and passing through said auxiliary plate or compensator.

The device according to the invention may be arranged as a compact block, in which the various members, or at least part of the said members, are rotatably mounted in order that their respective angular positions with respect to the optical axis of said block may be varied. It may be placed instead of the eye-piece of the microscope with which it is to be associated, in which case it is combined with an auxiliary objective, which is located near the image of the object as given by the objective of the said microscope, and with a microscope having a low magnification and arranged for the observation of the image formed by the said auxiliary objective. It may also be arranged in front of the objective of the microscope with which it is to be used.

The invention is described with more details hereafter, with reference to the appended drawings, in which.

Figure 1:
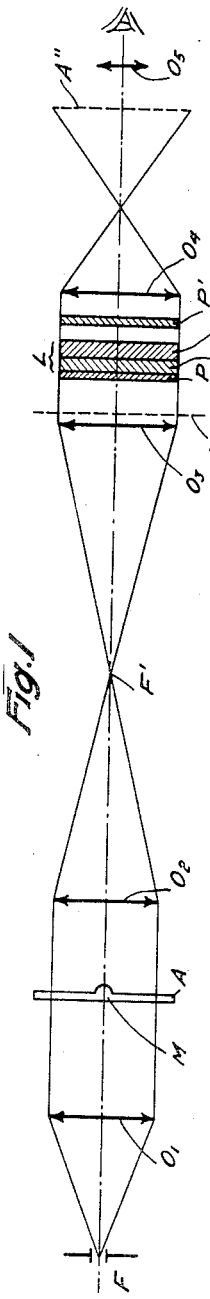
Fig. 1 is a diagrammatic, axial, sectional view of a microscope comprising an embodiment of the device according to the invention.

Referring to Figure 1, the microscope as shown comprises a condenser $O_1$, at the focus of which is arranged a slit F illuminated by means of white light, the said condenser thus forming a parallel beam which passes through the transparent object A arranged in front of the objective $O_2$ of the microscope. The object A is, for instance, a transparent glass plate comprising at M a slight excess in thickness which is the portion of the object which it is desired to observe.

The objective $O_2$ gives of A an image at A', which is observed through the device according to the invention. An objective $O_3$ the object focus of which coincides with the image focus F' of the objective $O_2$ of the microscope, is arranged at close proximity of the said image A'. The light then passes through two optically crossed crystalline plates $L_1$ and $L_2$ having parallel faces and which are cut in a crystal at 45° from the optical axis thereof. A small auxiliary microscope having a low magnification, comprising an objective $O_4$ and an eyepiece $O_5$ makes it possible to observe the image A' through the unit L formed of the plates $L_1$ and $L_2$. On the front face of plate $L_1$ is stuck a polariser P, whereas an analyser P', rotatably arranged about the optical axis of the system, is arranged behind unit L. The polariser P and the analyser P', instead of occupying the positions shown in the figure, could be respectively arranged anywhere on the path of the light rays, provided polariser P is located between the light source illuminating slit F and the unit L and that the analyser is located between the said unit L and the eye of the operator.

Figure 4:
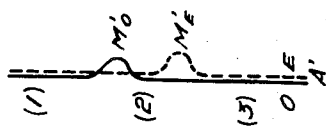
Fig. 4 is a diagram showing an axial section of the image obtained with one embodiment of the invention.

It is known that a system such as L, formed of two crystal plates cut at 45° from the optical axis, and optically crossed, causes the phenomenon of double refraction. Consequently the image A" of A', given by the objective $O_4$, once the rays have passed through unit L, is actually formed of two images polarized at right angles, one an ordinary image O, the other an extraordinary image E (Fig. 4). The said two images are offset in width, due to the double refraction. If the plates $L_1$ and $L_2$ are not of the same thickness, the unit L creates a difference of path between the rays forming the image O and those forming the image E, whereby the two said images are also offset in depth. If, on the contrary, the said two plates $L_1$ and $L_2$ have the same thickness, there is no difference of path between the rays forming the images O and E respectively, whatever the wave length of the light, and the said images are not offset in depth.

It will first of all be supposed that the thickness of the plates $L_1$ and $L_2$ is chosen in such a manner that the offsetting in width of images O and E is larger than the width of the image of the object portion M which it is desired to observe (Fig. 4). Under such conditions, it may be seen that, while in the areas (1), (2) and (3) of Figure 4, the two images are superposed without any difference of path, things are different at $M_O'$ and $M_E'$ where the ordinary and extraordinary images of the detail M are located, because of the phase variations introduced by variations in thickness of the object. The image $M_O'$ interferes with the background of the image E' and conversely the image $M_E'$ interferes with the background of the image O. The two images $M_O'$ and $M_E'$ appear with a luminous intensity which is proportional to the phase, exactly as in the phase contrast method. In the present case, however, there is no phase plate, hence no stopping of light beams. The diffraction fringes which appear in phase contrast no longer exist and the variations of luminous intensity of the images reproduce the phase variations resulting from the variations in thickness of the object, whether these variations be slow or rapid. Furthermore, by rotating the analyser, it is possible to vary the relative intensities of the ordinary and extraordinary images, hence to obtain a result similar to that obtained with a phase plate having a variable absorption.

The same results would be obtained if, instead of one or more local variations in thickness, the object showed one or more local variations in refractive index.

Figure 2:
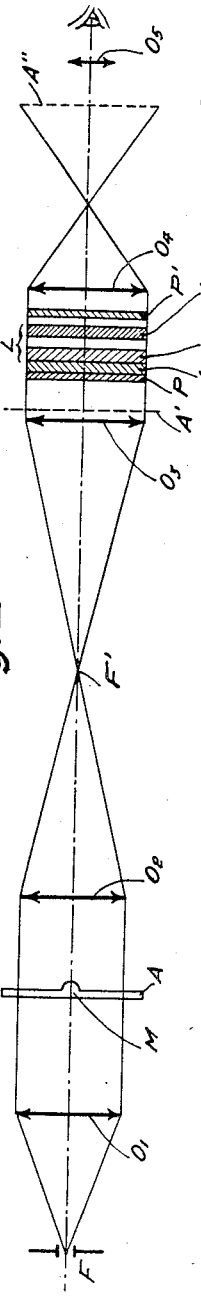
Fig. 2 is a similar view relating to another embodiment.

The device shown at Figure 2 comprises the same members as the above described device, with the only difference that a crystal plate $L_3$, a half-wave for yellow, is arranged between the unit L and the analyser $P'$. In this case, in the areas (1), (2) and (3), the path difference being of one half wave length ($\lambda/2$) between the ordinary and extraordinary images for yellow, the field appears with the sensitive colour. In the areas $M_O'$ and $M_E'$, this path difference becomes $\lambda/2$ plus or minus the path of difference introduced by the object. The sensitive colour changes at once. The images $M_O'$ and $M_E'$ appear with colours which differ from that of the background field, their shades being symmetrical with respect to the sensitive colour and not complementary. It is possible, by changing the half wave plate, to modify at will the path difference between the rays forming the ordinary and extraordinary images, respectively, in the areas (1), (2) and (3) and to cause any desired shade to appear. The different colours of areas $M_O'$ and $M_E'$ will also vary. The mere appearance of the shade will make it possible to evaluate the phase difference resulting from the variations in thickness of the object.

It should be pointed out that exactly the same results may be obtained without any additional crystal plate, or compensator, by moving the slit F in the focal plane of the condenser and parallel with the fringes ad infinitum of the plates L. It is even possible to use simultaneously one or more slits such as $F_1$, located in the focal plane of the condenser, for obtaining varied effects due to the superposition of shades.

Figure 5:
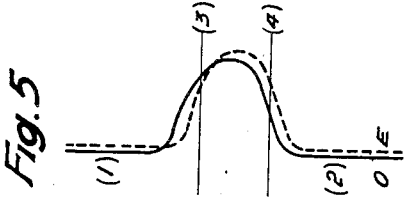
Fig. 5 is a similar diagram relating to another embodiment.

If, in the same device as that shown at Figure 2, the plates $L_1$ and $L_2$ are given a thickness which is sufficiently small for the offsetting in width of the two images resulting from the double refraction through unit $L_1$ to be very small, an image $A''$ is obtained, of the type shown at Figure 5, in which the two images $M_O'$ and $M_E'$ are hardly separated. Due to the presence of the plate $L_3$, half-wave for yellow, a purple shade is obtained in areas (1) and (2) of Figure 5, as in the above described case. On the contrary, in areas (3) and (4), due to the offsetting, the difference of path between the rays forming the images $M_O'$ and $M_E'$, respectively, is no more $\lambda/2$ for yellow and the sensitive shade changes. In this case the shade observed in areas (3) and (4) give the tangent of the phase angle in said areas. It may be conceived that, if the lateral offsetting of the images is not too great, the curves O and E, together observed, "moulds" the image with a sufficient precision for giving a good reproduction of the object.

Figure 3:
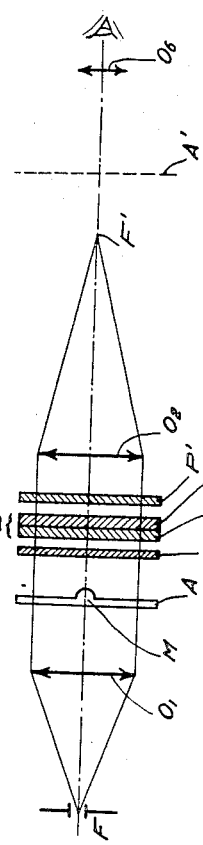
Fig. 3 is a similar view relating to a third embodiment.

As shown at Figure 3, it is also possible to arrange the unit L, the polariser P and the analyser $P'$ between the object A and the objective $O_2$ of a conventional microscope having a simple eye-piece $O_6$ of usual type. As in the above described examples, the polariser P and the analyser $P'$ may occupy positions which are different from the positions shown in the figure. Thus, the polariser P may be placed between the object and the slit F and the analyser may be placed anywhere between the unit L and the eye of the observer.

In the case of Fig. 3, in order that the astigmatism due to the double refraction should not interfere with the observation, the common thickness $e$ of the plates should not be too large. The following table shows, for various numerical apertures, the thicknesses $e$ which should not be exceeded.

| $n \sin u =$ | $e \leq$ |
|---|---|
| 1.26 | 0.05 |
| 0.90 | 0.1 |
| 0.45 | 0.4 |
| 0.28 | 1 |

However, the arrangement shown in Figure 3 is less practical than those of Figures 1 and 2, because the construction of a polariscope having very thin plates is extremely difficult.

The device according to the invention may be used with any magnification, and there is no stopping of the beams, hence no extraneous diffraction fringes.

What I claim is:

1. An optical instrument for the observation of a transparent object, comprising in combination with a microscope having along its optical axis in the order named: a source of white light producing a parallel beam, a condenser for passing said beam through the said object, a first objective, a second objective the object focus of which coincides with the image focus of said first objective, and an ocular for observing the image; a pair of optically crossed bi-refringent crystal plates with parallel faces and of different thicknesses, said plates being cut in a crystal at 45° to its optical axis, said plates being disposed between said object and said ocular on the optical axis of said instrument, a polarizer disposed on the optical axis of the instrument between said source and said crystal plates, and a rotatable analyzer disposed on the optical axis of the instrument between said crystal plates and the eye of the observer.

2. An instrument according to claim 1, wherein said second objective is mounted in the vicinity of the image of said object formed by said first objective, and is adapted to form a second image of said object, and wherein a third objective is coupled with said ocular for observing said second image through said crystal plates.

3. An instrument according to claim 1, wherein said polarizer is in contact with one of said crystal plates.

4. An instrument according to claim 1, wherein said analyzer is in close proximity to said crystal plates.

5. An instrument according to claim 1, wherein an auxiliary crystal plate, adapted to create a difference of optical path between the light rays passing therethrough, is disposed on the optical axis of the instrument adjacent said pair of crystal plates, between said plates and said ocular.

6. An instrument according to claim 5, wherein said auxiliary crystal plate is a half-wave plate.

7. An instrument according to claim 1, wherein said ocular comprises a small auxiliary microscope having an objective and an ocular for observing the image.

References Cited in the file of this patent

UNITED STATES PATENTS

| | | |
|---|---|---|
| 2,435,953 | Bennett | Feb. 17, 1948 |
| 2,516,905 | Osterberg et al. | Aug. 1, 1950 |
| 2,591,701 | Jaffee | Apr. 8, 1952 |
| 2,601,175 | Smith | June 17, 1952 |